(12) United States Patent
Coffin

(10) Patent No.: US 10,983,334 B2
(45) Date of Patent: Apr. 20, 2021

(54) MIRROR ALIGNMENT IN OPTICAL SCIENTIFIC INSTRUMENTS

(71) Applicant: Thermo Electron Scientific Instruments LLC, Madison, WI (US)

(72) Inventor: John Magie Coffin, Blue Mounds, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 146 days.

(21) Appl. No.: 16/234,656

(22) Filed: Dec. 28, 2018

(65) Prior Publication Data

US 2019/0204585 A1 Jul. 4, 2019

Related U.S. Application Data

(60) Provisional application No. 62/610,999, filed on Dec. 28, 2017.

(51) Int. Cl.
| | |
|---|---|
| *G02B 26/08* | (2006.01) |
| *G02B 7/182* | (2021.01) |
| *G01J 3/02* | (2006.01) |
| *G01J 3/06* | (2006.01) |
| *G01J 3/453* | (2006.01) |
| *G02B 26/10* | (2006.01) |
| *G02B 21/00* | (2006.01) |

(52) U.S. Cl.
CPC .......... *G02B 26/0816* (2013.01); *G01J 3/021* (2013.01); *G01J 3/06* (2013.01); *G01J 3/4535* (2013.01); *G02B 7/182* (2013.01); *G02B 26/10* (2013.01); *G02B 26/101* (2013.01); *G02B 21/0048* (2013.01)

(58) Field of Classification Search
CPC .... G02B 26/0816; G02B 7/182; G02B 26/10; G02B 26/101; G02B 21/0048; G02B 26/0841; G02B 26/085; G02B 26/0858; G02B 26/0866; G02B 26/105; G02B 26/121; G01J 3/021; G01J 3/06; G01J 3/4535
USPC ...................................... 359/199.1
See application file for complete search history.

(56) References Cited

U.S. PATENT DOCUMENTS

| | | | |
|---|---|---|---|
| 4,923,263 A | * | 5/1990 | Johnson ................ G02B 26/10 250/235 |
| 5,883,712 A | | 3/1999 | Coffin |

(Continued)

OTHER PUBLICATIONS

International Search Report & Written Opinion dated Apr. 26, 2019 for PCT/US2018/067927.

*Primary Examiner* — William R Alexander
*Assistant Examiner* — Henry A Duong
(74) *Attorney, Agent, or Firm* — Banner & Witcoff, Ltd.

(57) ABSTRACT

A mirror assembly has one or more axes of motion and includes a mirror that is movable and forms an acute angle with a plane orthogonal to its axis of motion. The mirror assembly may include a first reflective mirror surface in the incoming optical path that is movable and forms an acute angle with a plane orthogonal to its axis of motion, and a second reflective mirror surface in the outgoing optical path that is movable and forms an acute angle with a plane orthogonal to its axis of motion and is moveable in a linear translation to scan the mirror in the interferometer in a way to generate a normal interferogram.

31 Claims, 16 Drawing Sheets

(56) References Cited

U.S. PATENT DOCUMENTS

| | | | |
|---|---|---|---|
| 6,069,727 A * | 5/2000 | Cho | G02B 26/105 |
| | | | 359/226.1 |
| 6,587,246 B1 | 7/2003 | Anderton et al. | |
| 2005/0002039 A1 | 1/2005 | Abbink | |
| 2015/0168708 A1* | 6/2015 | Pasternak | G02B 23/02 |
| | | | 359/205.1 |

* cited by examiner

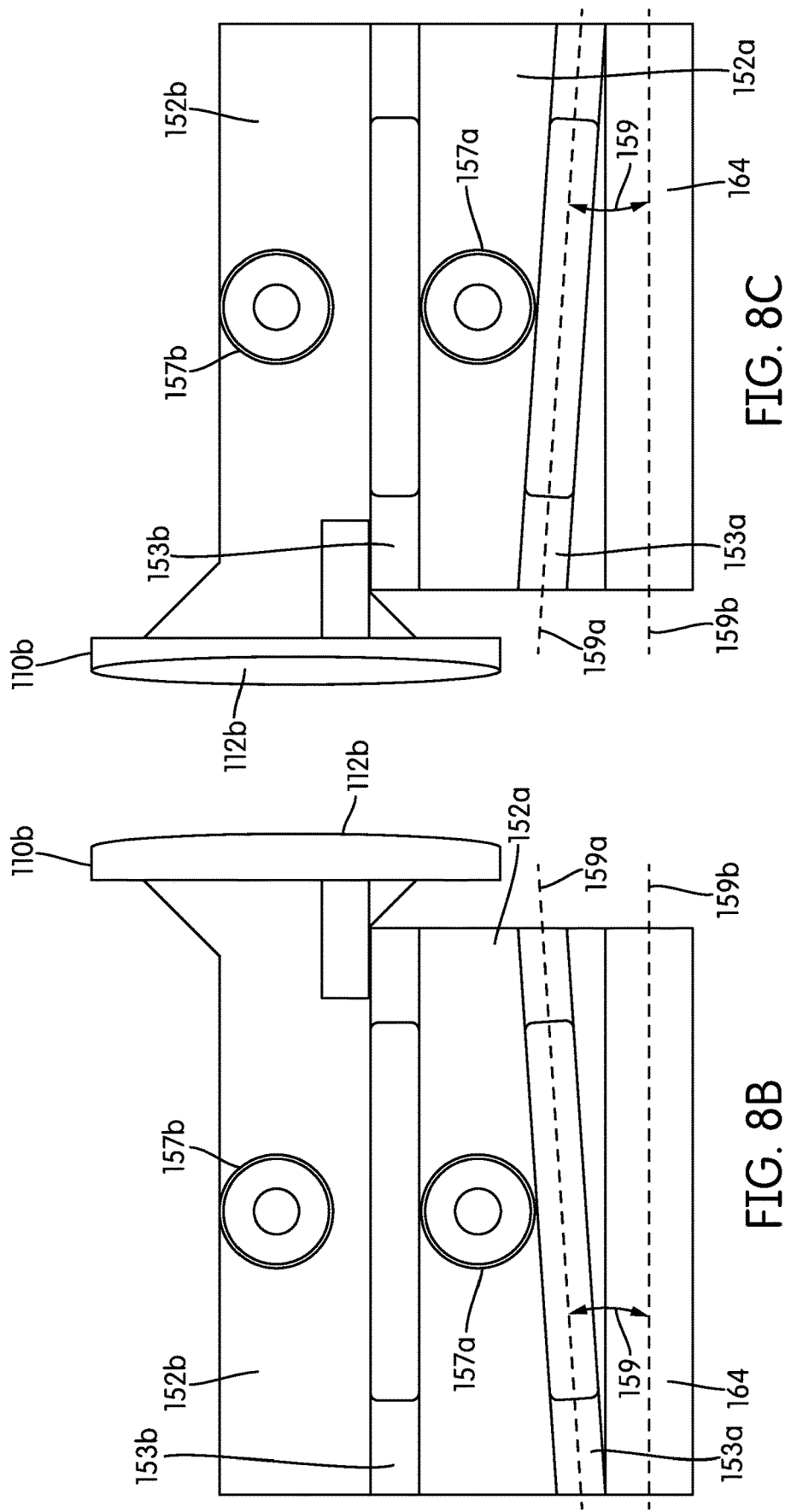

MIRROR ALIGNMENT IN OPTICAL SCIENTIFIC INSTRUMENTS

TECHNICAL FIELD

The disclosure generally relates to the technical field of optical scientific instrumentation. More specifically, the disclosure relates to mirror alignment systems for optical scientific instruments such as Michelson interferometers or microscopes.

BACKGROUND

Fourier transform infrared (FTIR) interferometric spectrometers are widely used in the analysis of chemical compounds. By measuring the absorption of infrared radiation by an unknown sample at various wave lengths in the infrared spectrum and comparing the results with known standards, these instruments generate useful information with respect to the chemical makeup of the unknown sample. In a typical FTIR spectrometer, infrared radiation from an infrared emitting source is collected, passed through an interferometer, passed through the sample to be analyzed, and brought to focus on an infrared detector. The interferometer system, in combination with the sample, modulates the intensity of the infrared radiation that impinges on the detector, and thereby forms a time variant intensity signal. It is the function of the detector to convert this time variant intensity signal to a corresponding time varying current. The current, in turn, is converted to a time varying voltage, which is presented to an analog-to-digital converter and then stored as a sequence of digital numbers to be processed in a processor associated with the spectrometer.

One important feature of the FTIR spectrometer is the moving mirror element that modulates the analytical radiation used by the instrument to study samples. The moving mirror allows a time-domain interferogram to be generated which, when analyzed, allows high resolution frequency-domain spectra to be produced. The computer performs a Fourier transform on the data to produce a spectrum which shows spectral-energy versus frequency.

In these types of instruments mirror positional accuracy is important because deviations in the mirror alignment produce small errors in the time-domain interferogram which may translate into large errors in the frequency-domain spectrum. In a typical interferometer, mirror deviations larger than $\frac{1}{20}$ wave length of the analytical radiation used are considered significant and can seriously degrade the quality of the entire instrument.

The alignment of the mirror is ordinarily accomplished by supporting the mirror in a high precision bearing, such as an air bearing, and by attempting to align the bearing to the desired degree of precision. Alignment is usually accomplished by means of differential screws which are manually adjusted to align the moving mirror as perfectly as possible. This is a time consuming procedure requiring significant skill. It also adds to manufacturing expense and to field service costs because realignment is often required. In addition, it mandates the use of extremely accurate bearings which may be very expensive.

Efforts have been made to eliminate the need to manually align the high precision bearings. Although still requiring the use of high precision bearings, automatic static alignment at least relieves the user from performing time consuming realignments. For instance, some devices which automatically align the moving mirror use stepper motors to accomplish substantially automatic simulation of the manual alignment procedure. These devices typically use a computer which aids in the alignment of the static mirror at periodic service intervals. Disadvantages of these devices include slow speed, large size, high cost, and continuing dependence on high precision bearings.

Dynamic adjustment of the mirror tilt to correct for imprecise bearings and achieve desired alignment has been difficult to accomplish in practice. Such prior adjustment devices tend to be very expensive, slow, bulky, and poor in performance. For example, one device uses piezoelectric positioners to dynamically adjust mirror tilt. However, the positioners are large, expensive, and use up to one thousand volt drive levels. In addition to being large and expensive, power supplies for such high voltages create undesirable operating hazards.

To somewhat address the aforementioned conventional problems, mirror alignment devices have been developed. Such devices are described and claimed in the following U.S. patents (the disclosures of which are incorporated herein by reference): U.S. Pat. No. 5,276,545, entitled "MIRROR ALIGNMENT AND DAMPING DEVICE" and issued Jan. 4, 1994; U.S. Pat. No. 5,239,361, entitled "DYNAMIC MIRROR ALIGNMENT DEVICE FOR THE INTERFEROMETER OF AN INFRARED SPECTROMETER" and issued Aug. 24, 1993; U.S. Pat. No. 5,883,712, entitled "INTERFEROMETER OF AN INFRARED SPECTROMETER WITH DYNAMIC MOVING MIRROR ALIGNMENT" and issued Mar. 16, 1999; and U.S. Pat. No. 5,896,197, entitled "INTERFEROMETER HAVING GLASS GRAPHITE BEARING" and issued Apr. 20, 1999. Notwithstanding the advancements provided by these mirror alignment devices, there remains room for improvement.

Accordingly, the present disclosure addresses the need for an improved mirror alignment devices utilized in scientific optical interferometers such as an FTIR interferometer. Such mirror alignment devices can also be used in other optical systems such as microscopes, telescopes, and printers that need precise control of the angle of a beam of light.

SUMMARY

Attempts to reduce the need for high precision bearings have been successful by using dynamic alignment where the angle of one or more of the mirrors are tilted by a control system to correct error caused by linear bearing during data collection. Dynamic alignment also corrects tilt errors caused by temperature over time. Most tilt errors in interferometers are slow enough that a dynamic correction system has about 0.1 seconds or more to correct the error. The rotating mirror systems described herein have demonstrated a quick enough response to correct the errors in a working interferometer with dynamic alignment.

Aspects of the disclosure are associated with improved mirror alignment devices suitable for use as the mirrors of a Michelson interferometer or a microscope. The improved mirror alignment devices have one or more axes of motion. Exemplary embodiments include a reflective mirror surface that is movable and forms an acute angle with a plane orthogonal to its axis of motion. Further exemplary embodiments include a reflective mirror surface that is movable and forms an acute angle with a plane orthogonal to a first axis of motion, and that is further movable relative to a second axis of motion. In accordance with further exemplary embodiments, such a device is part of an interferometer mirror assembly and includes a first reflective mirror surface in the incoming optical path that is movable and forms an acute angle with a plane orthogonal to its axis of motion, and further includes a second reflective mirror surface in the outgoing optical path that is movable and forms an acute angle with a plane orthogonal to its axis of motion.

In accordance with exemplary embodiments, a mirror assembly for precise control of a light beam includes a first mount including a first axis of rotation. A first mirror is coupled to the first mount and includes a reflective surface having a surface plane that is nearly perpendicular to a plane of the first axis of rotation. A light source is configured to aim a beam at the reflective surface, wherein rotation of the first mount translates the beam over a first controllable distance on a target surface.

In accordance with further exemplary embodiments, the mirror assembly includes a second mount comprising an axis of rotation. A second mirror is coupled to the second mount and includes a reflective surface having a surface plane that is nearly perpendicular to the axis of rotation. The first mirror aims the beam at the reflective surface of the second mirror and rotation of the second mount translates the beam over a second controllable distance on the target surface.

In accordance with further exemplary embodiments, an interferometer mirror assembly includes a beamsplitter defining incoming and outgoing optical paths. A first movable mirror assembly is disposed at least partially in one of said incoming and outgoing optical paths, and includes a first mount including a first axis of motion. A first mirror is coupled to the first mount and includes a reflective surface having a surface plane that is nearly perpendicular to the first axis of rotation. A light source is configured to aim a beam at the reflective surface, wherein rotation of the first mount translates the beam over a first controllable distance on a target surface. A second movable mirror assembly is disposed at least partially in another of said incoming and outgoing optical paths, and includes a second mount including a second axis of motion. A second mirror is coupled to the second mount and includes a reflective surface having a surface plane that is nearly perpendicular to the second axis of rotation. Reflected light from the first mirror is directed to the reflective surface of the second mirror, and rotation of the second mount translates the beam over a second controllable distance on the target surface that is substantially perpendicular to the first controllable distance.

These and additional features and advantages disclosed here will be further understood from the following detailed disclosure of certain embodiments, the drawings thereof, and from the claims.

BRIEF DESCRIPTION OF THE DRAWINGS

FIG. 8B is a right-side view of the double-flexure mirror bearing of FIG. 8A.

FIG. 8C is a left-side view of the double-flexure mirror bearing of FIG. 8A.

Figure 1:
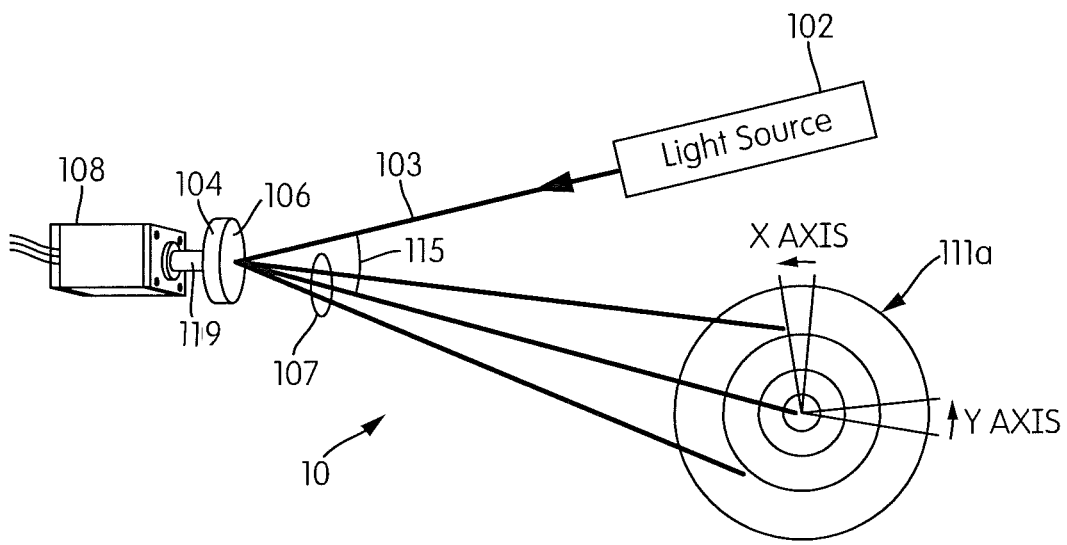
FIG. 1 is a schematic view demonstrating a single mirror implementation of alignment principles in accordance with aspects of the disclosure.

The figures should be understood to present illustrations of the disclosure and/or the principles involved. As would be apparent to one of skill in the art having knowledge of the present disclosure, other devices, methods, and particularly equipment used in scientific optical interferometers such as an FTIR interferometer, will have configurations and components determined, in part, by their specific use. Like reference numerals refer to corresponding parts throughout the several views of the drawings.

DETAILED DESCRIPTION

In the description of the disclosures herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for the purpose of clarity.

Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing dimensions such as length, width, depth, thickness, angle, duration, and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Interferometers and their operation are well-known to those skilled in the art and thus will not be discussed at length in this description. In general, however, a Michelson interferometer is one type of interferometer and includes a rigid base on which is mounted a beam splitter, a fixed mirror, a first conduit for incoming light and a second conduit for outgoing light. The beam splitter, fixed mirror, and conduits are constructed and positioned according to conventional Michelson interferometer designs.

As a general principle of operation, an input beam of infrared radiation from a source is directed through the first conduit and is received by the beam splitter. The fixed mirror thereafter receives and returns a first beam over a fixed length optical path from the beam splitter. An adjustable plane mirror as part of a moveable assembly, to be discussed below, receives and returns a second beam over a variable length optical path from the beam splitter. The optical path length of the second beam between the beam splitter and the adjustable plane mirror is generated by one or more control instruments to provide for optical path differences between the first and second beams. The beams are combined at the beam splitter and directed through the second conduit to enable a resultant interferogram to be measured. However, while the discussion is directed to Michelson configurations, it is to be understood that the mirror bearing configurations disclosed herein, can also be utilized in other optical/mechanical instruments, e.g., microscopes, as known to those skilled in the art, wherein it is desired to capitalize on the beneficial aspects provided by the combinations.

As discussed in more detail below, exemplary embodiments use rotation of a mirror mounted on a bearing with an axis of rotation nearly perpendicular to the surface of the mirror. Rotating the mirror on the bearings through a small angle (e.g., approximately 1 to approximately 20 degrees of rotation) provides a controllable amount of tilt from approximately 0.001 to approximately 5 degrees in the reflected light beam. This change in tilt can be with respect to a vertical plane, a horizontal plane, or at any angle, depending upon the orientation of the angle of offset of the reflective surface of the mirror. This provides one axis of control for one bearing mirror assembly. In certain embodiments, the mirror may be rotated on the bearings through an angle between approximately 1 and approximately 20 degrees of rotation.

The term "approximately" as used herein is meant to mean close to, or about a particular value, within the constraints of sensible, commercial engineering objectives, costs, manufacturing tolerances, and capabilities in the field of mirror alignment systems manufacturing and use. Similarly, the term "substantially" as used herein is meant to mean mostly, or almost the same as, within the constraints of sensible, commercial engineering objectives, costs, manufacturing tolerances, and capabilities in the field of mirror alignment systems manufacturing and use.

If two axes of control are needed, that is, in the horizontal (X) and vertical (Y) directions, then two separate mirror systems are needed. Alternatively, as discussed in greater detail below, two separate bearing systems with an offset angle between their rotation axes can be used to support two axes of control of a single mirror, The range of reflected light beam tilt is controlled by mounting the mirror with a small angle, e.g., one degree, off of perpendicular to the bearing axis, thereby providing a way to introduce a light beam tilt of about 300 arc seconds with five degrees of bearing rotation. With a larger angle, e.g., four degrees off of perpendicular to the bearing axis, the same five degrees of mirror rotation will introduce control over a range of 1200 arc seconds. This range of control is adjustable over a wide range, depending upon system needs, by varying the mirror angle offset from the axis of rotation from near zero to six degrees or more.

Alternatively, a single mirror can be mounted on two different sets of bearings that together have about a four degree angle offset between the two bearing systems and the reflective surface of the mirror. This would allow control of the tilt on the reflected light beam in two different orthogonal axes if the angle offsets of the bearing systems are offset 90 degrees with respect to each other. Each bearing may have a separate rotation control system that can be controlled by a hand screw, an electric motor, a stepper motor, or a linear motor to allow independent X-axis and Y-axis control with a single mirror. This two bearing design can be used in multiple applications beyond an interferometer. Such a mirror mount will allow a low cost general purpose mirror alignment system that could be used in many precision optical systems where small X and Y movement is needed.

As discussed in more detail below, the adjustable rotating mirror mounts can be controlled by DC motors (e.g., linear voice coil motors or standard rotary motors), stepper motors, or manual adjustment by the operator (e.g., via hand adjustable screws, knobs, etc.). The axis of mirror rotation can be co-axial with the center of the mirror, or off center (e.g., off to a side of the mirror), thereby enabling mounting of the movable mirror rotational bearing in multiple different positions.

Exemplary embodiments include the use of two motors to control two offset axes of movement of a single mirror. Each motor may drive a separate mirror mount having a respective axis of movement for rotation, thereby providing X, Y control of movement of the mirror surface along two orthogonal axes of orientation.

Referring to FIG. 1, an exemplary embodiment 10 includes a mirror 104 with its reflective surface 106 mounted nearly perpendicular to the rotational axis 119 of the motor assembly 108. As discussed in more detail below, this causes light 103 from a light source 102, such as a laser, to be reflected with small changes in the angle 115 of the reflected light 107 as the mirror is rotated. For example, if the mirror surface 106 is mounted one degree away from perpendicular (89 degrees away from parallel) to the rotational axis 119, the reflected light 107 will produce a spot on a target region that will move in a path having a shape of a narrow cone, and, when viewed on the target region, in a circle 111a having a radius of two degrees. If the mirror angle is increased to two degrees away from perpendicular (88 degrees away from parallel) to the rotational axis 119, a larger circle 111a having a radius of four degrees results. Therefore, rotation of mirror 104 can move reflected light 107 over a controllable distance on circle 111a, the target surface. In certain embodiments, reflected light 107 can move over a distance from approximately 0.1 mm to approximately 50 mm on the target surface of circle 111a with a target distance of approximately 300 mm from the mirror surface.

In certain embodiments, the mirror surface is substantially planar so as to allow translation and rotary motion (e.g., rotation) of the mirror surface. Curved mirrors can also be used, but the center of optical axis of the mirror and the center of rotation of the mirror mount must be carefully aligned when a curved mirror is used. Therefore, the easier to use substantially planar mirror is the typical choice.

Figure 2:
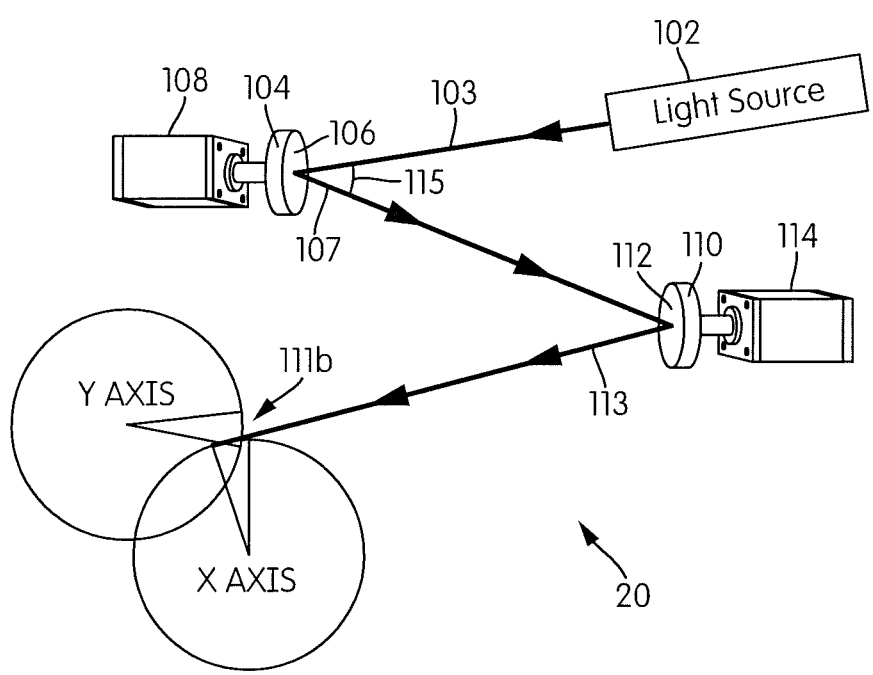
FIG. 2 is a schematic view demonstrating a dual mirror implementation of alignment principles in accordance with aspects of the disclosure.

Referring to FIG. 2, in another exemplary embodiment 20, two motors 108, 114 and two mirrors 104, 110 may be used to provide control over motions of the mirror surfaces 106, 112 affecting the final reflected light 113 relative to the perpendicular axes (X, Y) associated with the target region 111b. For example, the first mirror 104 and motor 108 may be associated with movement of the final reflected light 113 along one axis, while the second mirror 110 and motor 114 may be associated with movement of the final reflected light 113 along the other axis (e.g., with the first mirror 104 and motor 108 controlled to affect movement of the final reflected light 113 along the X-axis, and the second mirror 110 and motor 114 controlled to affect movement of the final reflected light 113 along the Y-axis).

Since the mirror is rotating on a defined axis, the reflected light beam travels in a circular path. The curvature of the path of the light beam results in an error because in most cases the desired movement of the light beam is a straight linear X or Y axis movement. If the rotation of the mirror is limited to less than + or −5 degrees, the error due to curvature of the path of the light beam is small and in many cases can be ignored.

In most cases, the optical system has two axes of control. By limiting the mirror rotation to less than about 5 degrees, the error caused by the circular curve is small in the first axis of control and can be corrected by a small correction in the other axis of control. This correction can be mathematically calculated in the X Y axis control system, or may be automatically provided by a control system that has closed loop feedback as is the case in a dynamic alignment system.

Figure 3A:
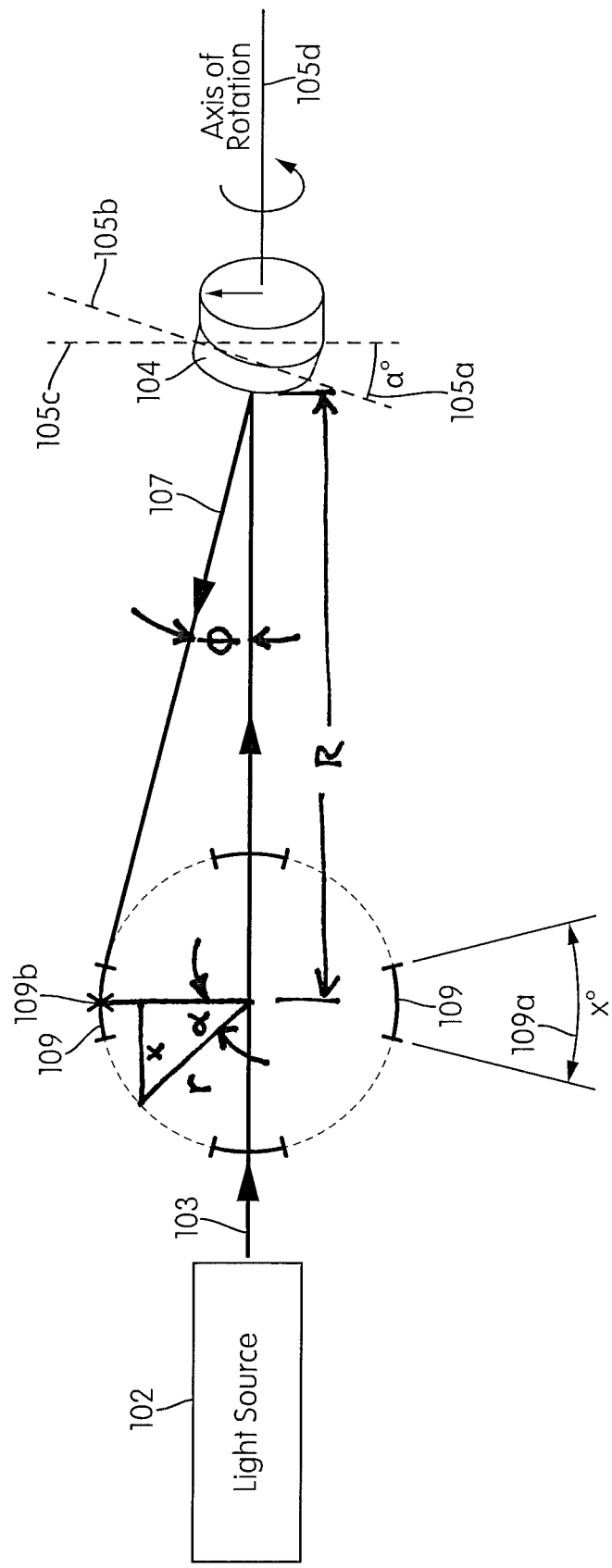
FIG. 3A is a schematic view demonstrating various mirror alignment principles in accordance with aspects of the disclosure.

Referring to FIG. 3A, in accordance with exemplary embodiments, a moveable mirror assembly (e.g., such as that depicted in FIG. 1) includes a light source 102 providing a light beam 103, e.g., a laser beam, for reflection off the surface of a moveable mirror 104 having a reflective surface (in plane 105b) forming an angle 105a off of an axis 105c perpendicular to the axis of movement 105d (e.g., rotation). Such angle 105a is known and small e.g., approximately 4 degrees, and produces reflected light 107 forming a similar angle relative to the incident light 103. As discussed above, this reflected light 107 produces a spot that impinges upon a target region 109 at a point 109b dependent upon the angle 105a of the mirror surface and amount of movement (e.g., rotation) of the mirror surface. Use of a single mirror in this manner, as discussed above, enables control within a single axis depending upon the current rotation of the mirror surface. Movement of the mirror is typically limited to move the reflected light 107 within a relatively small arc 109a.

As seen here, reflected light 107 is deviated by angle Φ. As mirror 104 is rotated, reflected light 107 moves about the circle, which has a radius r=RΦ. A smaller rotation θ of mirror 104 causes reflected light 107 to come in and out of the plane of FIG. 3A by X=rΦ. The out-of-plane angle $$\alpha = \frac{X}{R}.$$

Thus:

$$\alpha = \frac{r\theta}{R} = \frac{R\Phi\theta}{R} = \Phi\theta.$$

Consequently, the angle Φ is a convenient way of modifying the angular travel of the mirror assembly, and since it can be quite small, the movable mirror assembly can have a very small range of travel to achieve very fine precise control of the angle of the light beam from the reflective surface.

It is to be appreciated that reflected light 107 is not moved around a full circle. It is desirable to have reflected light move along arc 109a and another arc 111, seen in FIG. 3C and discussed below. These small arcs are substantially perpendicular to one another, and reasonably straight. Arcs 109 and 111 may extend along approximately 1/10 of the full circle, or $\theta_{max}$=157 mrad. Thus, the maximum deviation of the movable mirror assembly is $\alpha_{max}=\Phi\theta_{max}$. Likewise, the resolution of the movable mirror assembly is $\Delta\alpha=\Phi\Delta\theta$, where Δθ is the resolution of the motor moving mirror 104.

Choice of angle Φ allows a large rotation of the motor to produce an arbitrarily small deviation angle α, thus a relatively coarse mechanism can produce very fine deviation control. Practical benefits include the relatively low cost of a small stepping motor, and the ability to drive the motor to a known position such as a hard stop or limit switch. Also, it is to be appreciated that the motor does not need to have a high degree of precision for the embodiments described herein.

It is to be appreciated reducing the wobble or tilt of the motor shafts can be achieved by positioning the bearings in the motor farther apart, as in a longer motor. Such a longer motor can therefore use a lower cost bearing. Additionally, in certain embodiments, an additional bearing can be added, thereby allowing lower cost bearings and short motors to be used.

Figure 3B:
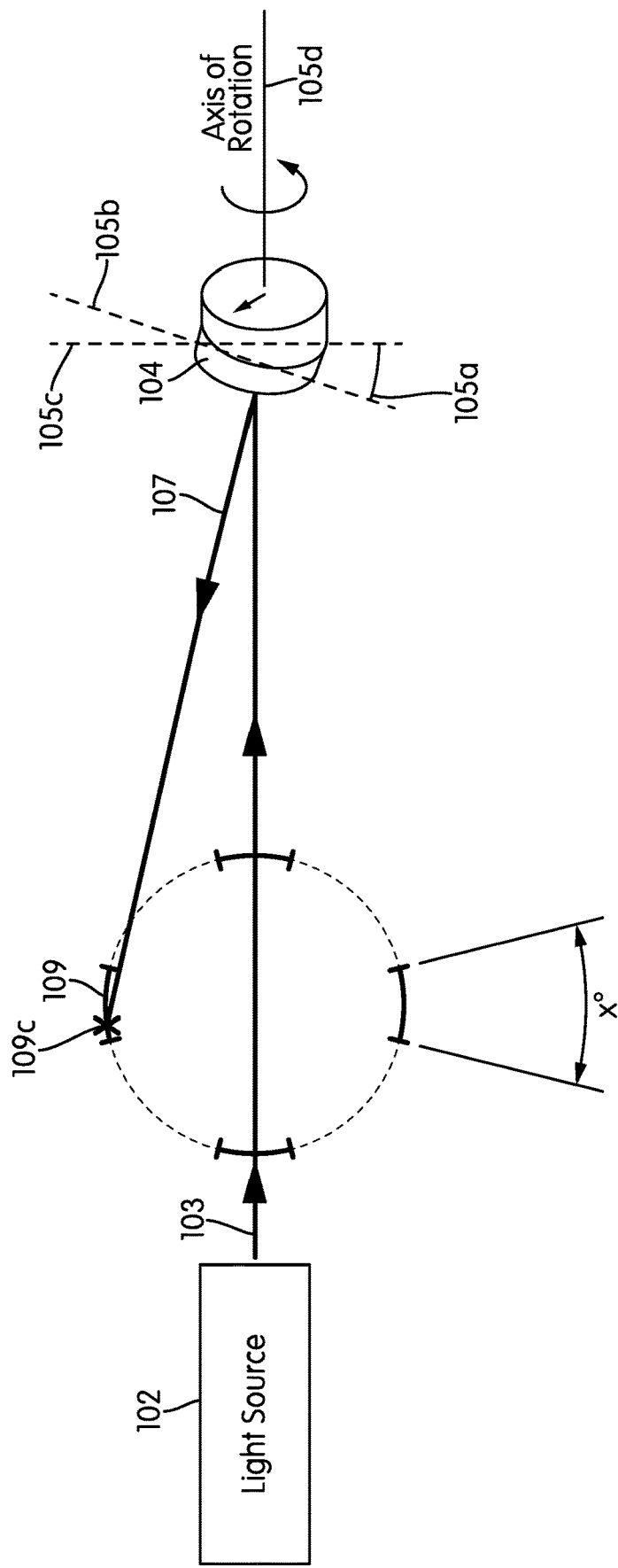
FIG. 3B is a schematic view of FIG. 1A demonstrated additional mirror alignment principles in accordance with aspects of the disclosure.

Referring to FIG. 3B, a counter-clockwise rotation of the mirror surface further displaces the point of impingement of the reflected light 107 from its first point 109b to a second point 109c within the arc 109.

Figure 3C:
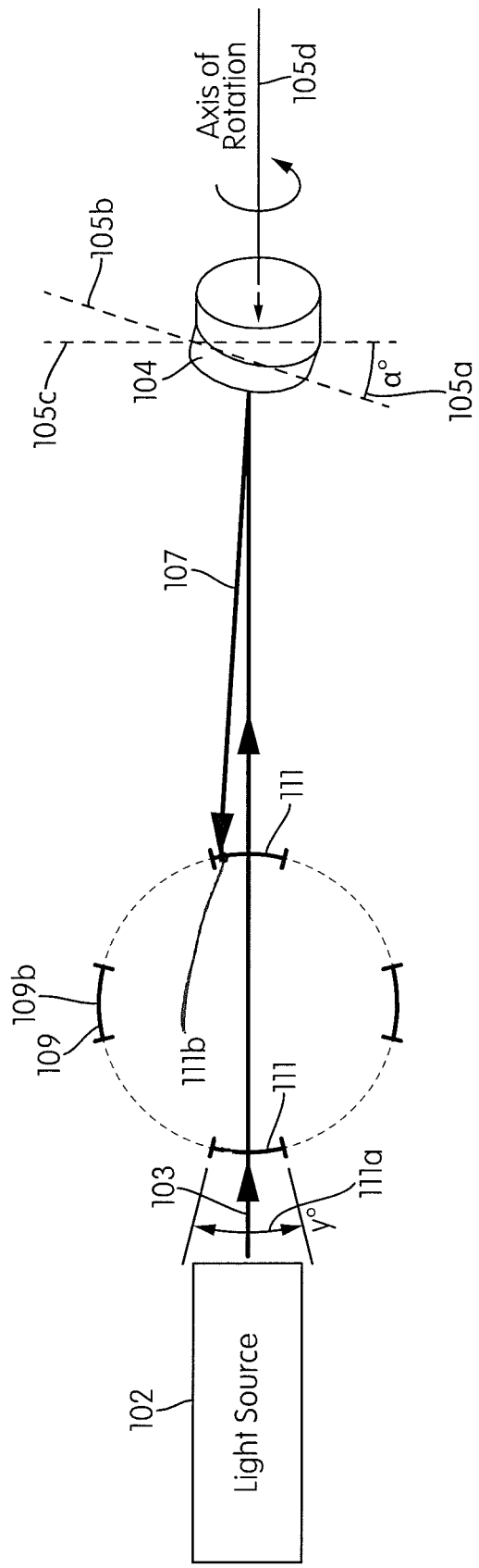
FIG. 3C is a schematic view of FIG. 1A demonstrated further mirror alignment principles in accordance with aspects of the disclosure.

Referring to FIG. 3C, further rotation of the mirror surface, e.g., by approximately 90 degrees, moves the point of impingement 111b of the reflected light 107 to within a new arc 111, where the reflected light moves substantially along the vertical axis.

Figure 4:
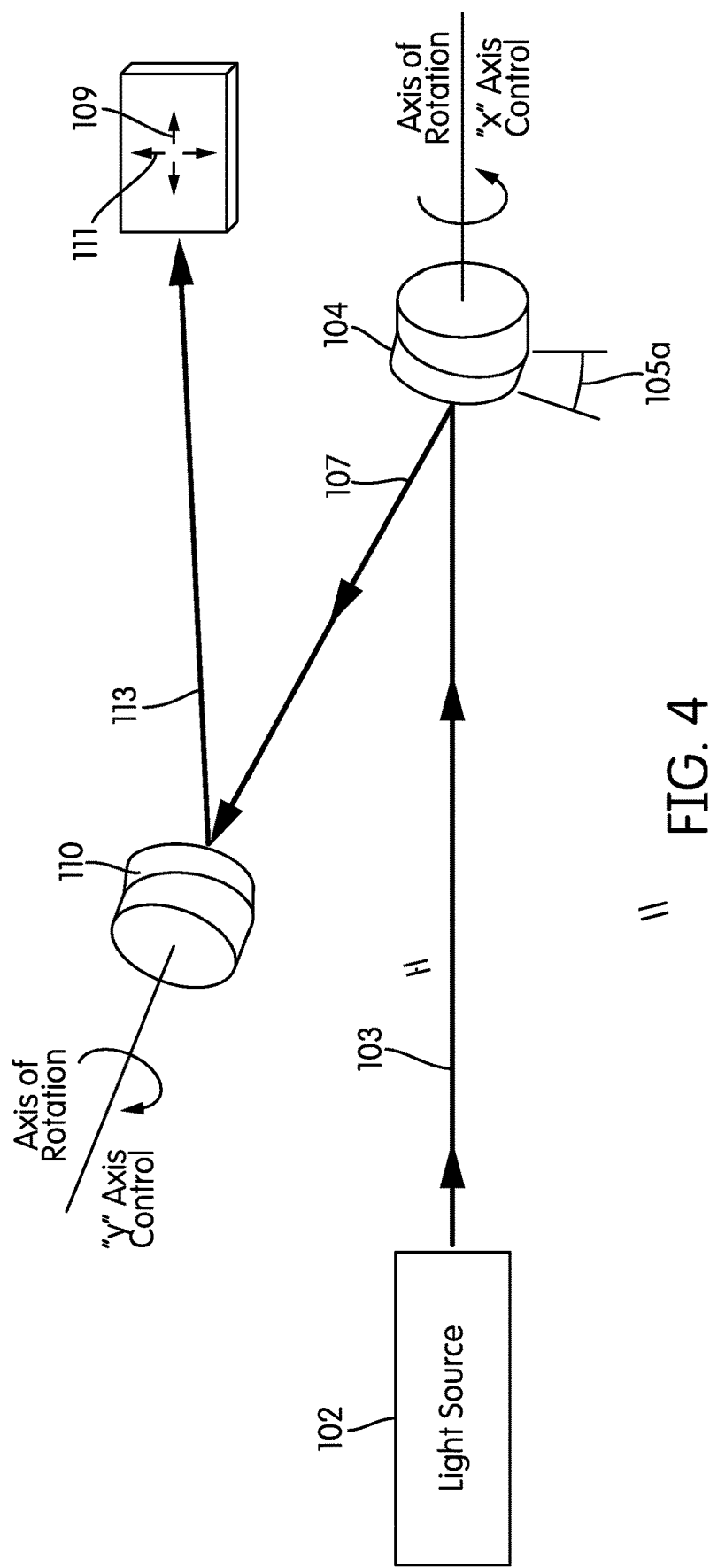
FIG. 4 is a schematic view demonstrating additional mirror alignment principles in accordance with aspects of the disclosure.

Referring to FIG. 4, in accordance with further exemplary embodiments, as discussed above for FIG. 2, a dual mirror system can be used. As discussed above, one moveable mirror 104 can be used to control movement within a small arc in the horizontal direction 109, while the other mirror 110 can be used to control movement in a small arc within the vertical direction 111.

Figure 5:
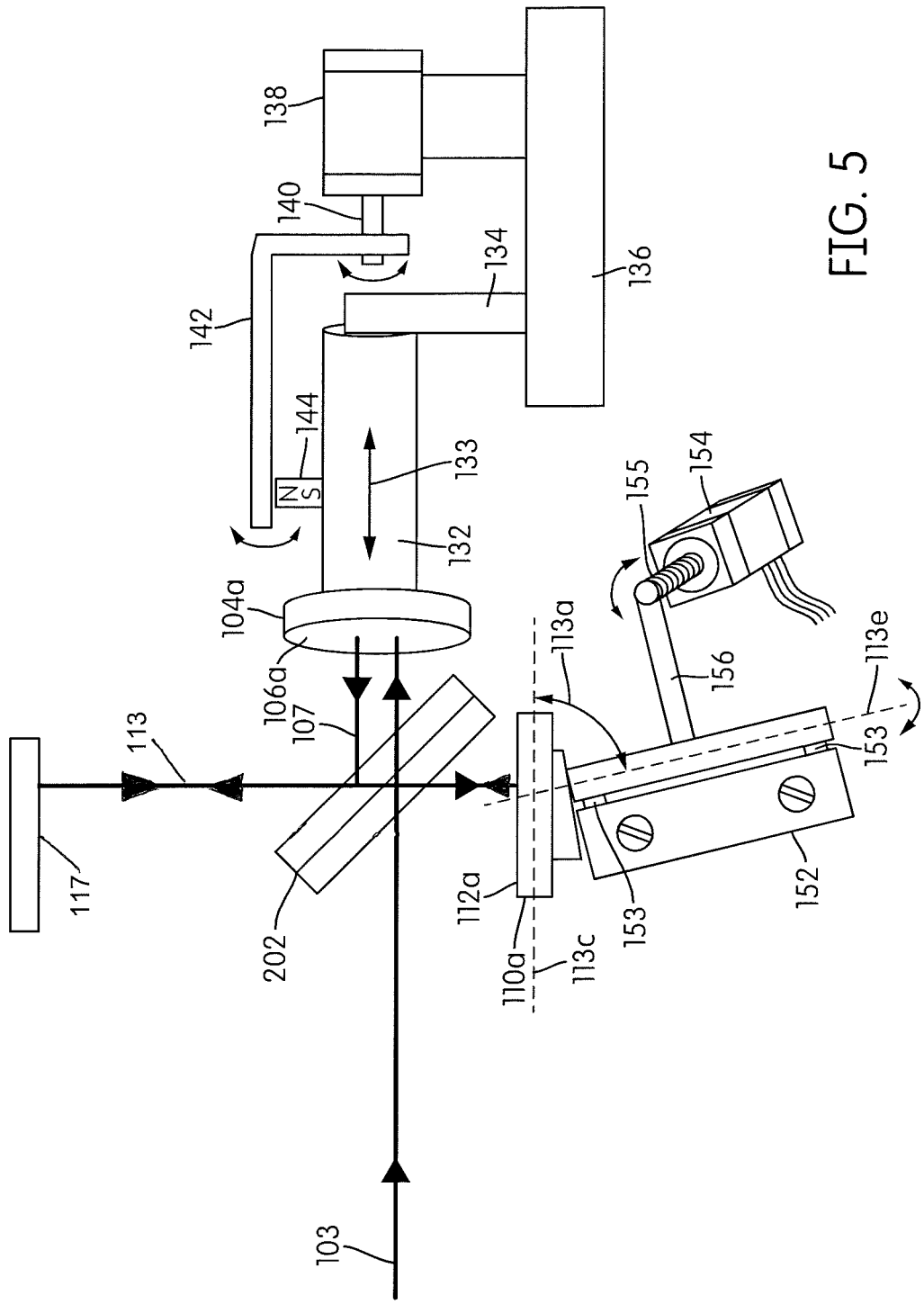
FIG. 5 is a schematic view of an example of a flexure mirror bearing in an FTIR interferometer in accordance with aspects of the disclosure.

Referring to FIG. 5, such moveable mirror assemblies can be used advantageously in optical instruments, including FTIR interferometric spectrometers such as Michelson interferometers, or microscopes. In accordance with well known principles, such devices have an incident light beam 103 which passes through a beam splitter 202 and is reflected off the reflective surface 106a of a first moveable mirror 104a. The reflected light 107 re-enters the beam splitter 202 and is combined with light reflected off of beamsplitter 202 and reflected from second moveable mirror 110a, the reflective surface 112a of which directs the final reflected light 113 to a target 117. In accordance with well known Michelson interferometer principles, the first moveable mirror 104a is reciprocated by a reciprocating member 132 along a first axis 133. First axis 133 is an axis of translation as it provides linear movement of first mirror 104a along first axis 133. This reciprocating member 132 can be controlled by a motor (not shown) located within its support member 134 secured to the base 136. The reflective surface 106a of the mirror 104a, offset from the vertical slightly as discussed above, can be rotated under the control of movement of a metal guide bar 142 disposed substantially parallel to the reciprocating member 132. A magnet 144 attached to reciprocating member 132 is attracted to and follows the metal guide bar 142 as it rotates about the reciprocating member 132 under control of a motor 138 driving a shaft 140 coupled to the guide bar 142, thereby causing the reciprocating member 132 to also rotate about its axis 133.

As discussed in more detail below, movement of the second mirror 110a (e.g., motion via rotation) can be achieved through the use of a mirror mount 152 to which the mirror 110a is mounted such that the plane 113c of the reflective surface 112a is offset at an angle 113a slightly from the axis 113e of movement available by the mirror mount 152 (e.g., rotation). As discussed in more detail below, such movement can be induced through the use of a motor 154 (e.g., linear or stepper) with a drive shaft 155 (e.g., screw drive) that drives a control arm 156 to cause movement within the mirror mounting assembly. For example, such movement can be effected through the use of bearings such as flexures 153 (e.g., blade flexures) incorporated within the mirror mount 152.

Figure 6A:
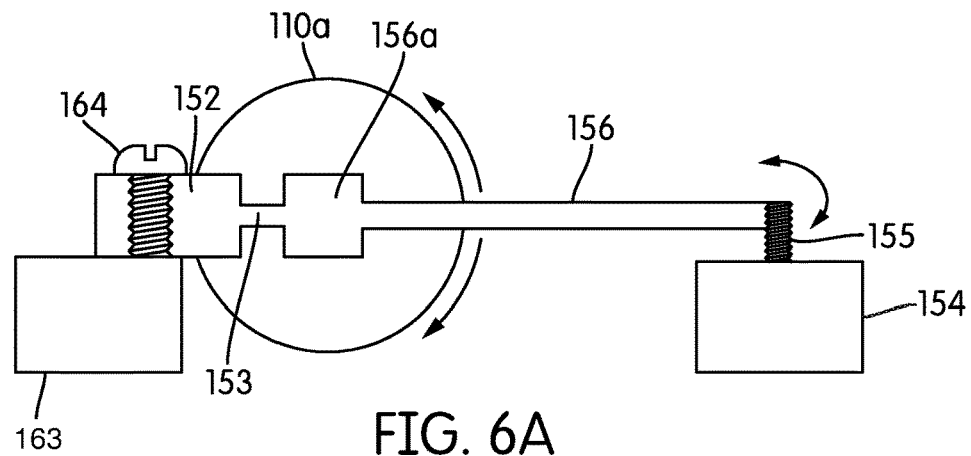
FIG. 6A is a schematic view of the flexure mirror bearing of FIG. 5 in accordance with aspects of the disclosure.

Referring to FIG. 6A, in accordance with exemplary embodiments, the mirror 110a can be affixed to the mount 152 via the mounting flange 156a and flexure 153. In turn, the mount 152 can be secured to a base member 163, e.g., via hardware, such as a bolt 164. Under control of a stepper motor 154, rotation of the screw drive shaft 155 can cause the control arm 156 to move in either a first or second direction (e.g., up or down), and thereby cause the mounted mirror 110a to revolve about an axis defined by the location of the flexure 153 relative to the mounting flange 156a. The amount of movement imparted to the control arm 156 (e.g., per each rotation) can be controlled in accordance with the pitch of the threads on the drive shaft 155 that engage with mating threads within the stepper motor 154.

Figure 6B:
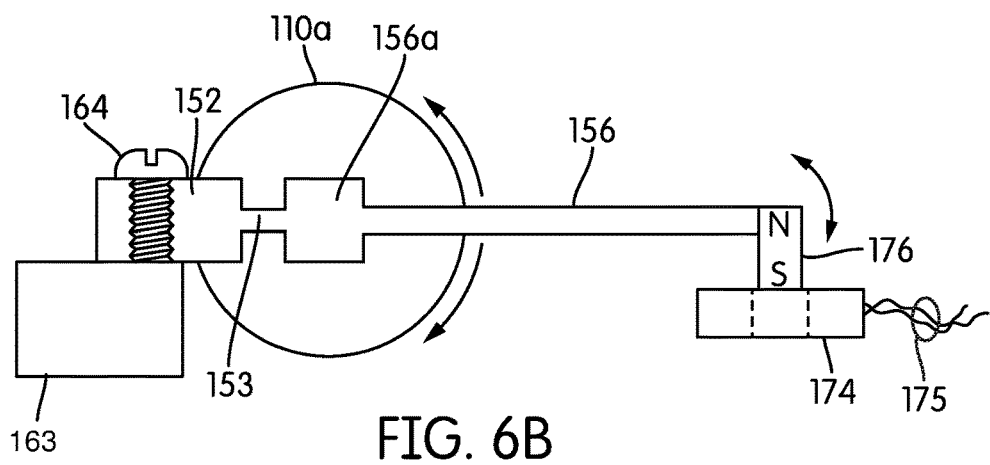
FIG. 6B is a schematic view of an alternative example of a flexure mirror bearing in accordance with aspects of the disclosure.
Figure 7:
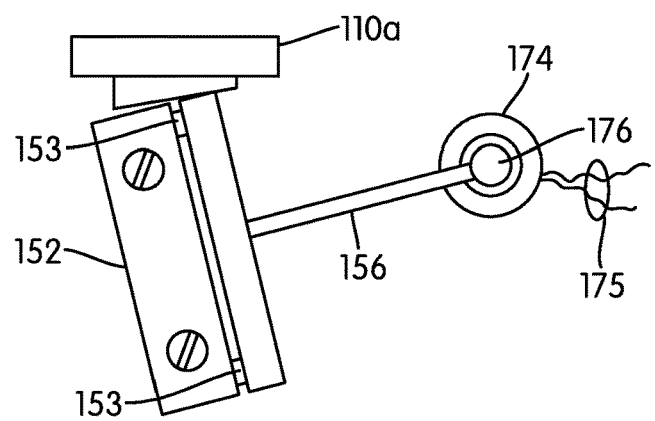
FIG. 7 is a schematic view of the flexure mirror bearing of FIG. 6B in accordance with aspects of the disclosure.

Referring to FIGS. 6B and 7, in accordance with other exemplary embodiments, a linear, or voice coil, motor 174 may be used instead of a stepper motor 154. In accordance with well-known principles, control signals in the form of control currents may drive the motor 174 via control wires 175 and cause a variable magnetic field to be produced, which causes a magnet 176 to move in either a first or second direction (e.g. up or down), thereby imparting similar movement to the control arm 156.

Figure 8A:
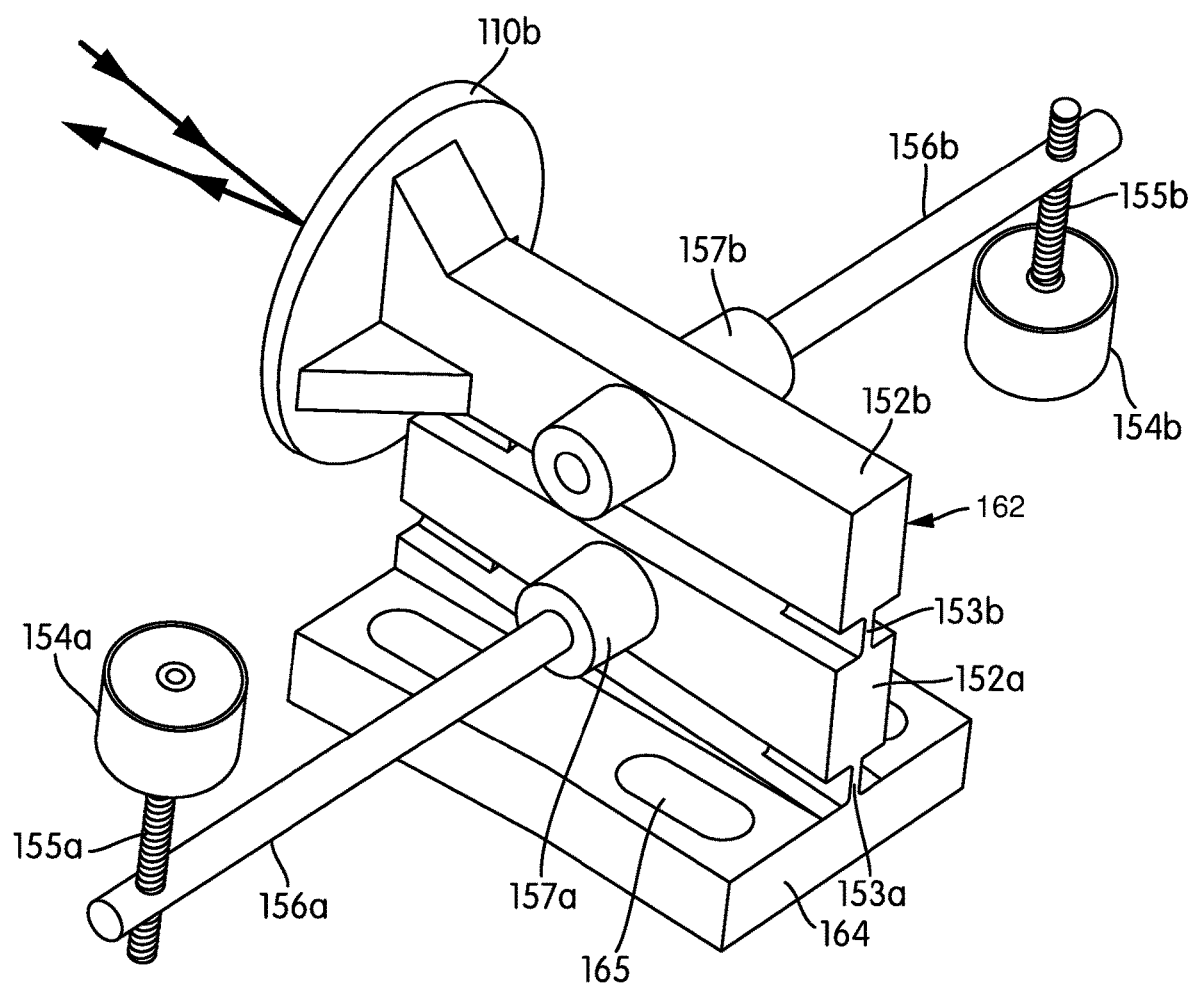
FIG. 8A is a perspective view of an example of double-flexure mirror bearing in accordance with aspects of the disclosure.

Referring to FIG. 8A, in accordance with exemplary embodiments, the second moving mirror assembly (FIG. 5) can be implemented in an embodiment where a mirror mount 162 includes dual sets of blade flexures 153a, 153b to enable motions (e.g., rotations) of the reflective surface of the mirror 110b about two respective axes of movement. As depicted for this example, the mirror 110b is mounted to an upper mount portion 152b of mirror mount 162, which is coupled via blade flexures 153b to a lower mount portion 152a. In turn, this lower mount portion 152a is coupled via additional blade flexures 153a to a base 164, which can be secured, e.g., via mounting hardware (not shown) within mounting slots 165. The mirror 110b may be mounted to the upper mount portion 152b in one of two ways. One mounting technique would position the center of the mirror surface 110b in co-axial alignment with an axis defined by the two upper flexures 153b, in which case movement of the upper mount portion 152b would cause the mirror 110b to rotate about such coaxial axes. Alternatively, the mirror 110b can be mounted such that its center is parallel to, but not co-axial with, that is, offset from, the axis defined by the two flexures 153b, in which case movement of the upper mount portion 152b would cause rotation of the mirror 110b about the axis defined by the two flexures 153b.

Motion of the reflective surface of the mirror 110b is controlled by operation of the lower drive elements 154a, 155a, 156a and upper drive elements 154b, 155b, 156b. For example, operation of the upper stepper motor 154b causes the upper drive shaft 155b to impart upward or downward movement of the upper control arm 156b and upper control arm mount 157b. This causes the upper mirror mount portion 152b to revolve about the axis defined by its flexures 153b. Accordingly, depending upon how the mirror 110b is mounted (as discussed above), the mirror 110b will rotate about such axis.

Similarly, mirror motion is imparted, at least in part, by the lower stepper motor 154a which, via its drive shaft 155a, control arm 156a, and control arm mount 157a, produces upward or downward movement, thereby causing the lower mount portion 152a to revolve about a lower axis defined by its flexures 153a that couple it to the base 164. This movement of the lower mount portion 152a causes the mirror 110b to rotate about the axis defined by the lower flexures 153a.

As a result, motion of the reflective surface of the mirror 110b occurs as rotation about an upper axis defined by the upper flexure 153b, which upper axis can be coaxial with or offset from a center of mirror 110b, and as rotation about a lower axis defined by the lower flexures 153a.

Referring to FIGS. 8B and 8C, side views of the moveable mirror assembly of FIG. 8A illustrate how the axis of rotation 159a defined by the lower flexures 153a is offset by an angle 159 from being parallel with an axis 159b defined by the mount base 164. It can also be seen how the angular offset of the reflective surface 112b of the mirror 110b can be achieved through the use of a tapered mirror 110b structure such that one edge is thicker (the edge of 110b facing the viewer in FIG. 8B) and the opposing edge is thinner (the edge of 110b facing the viewer in FIG. 8C).

Figure 8E:
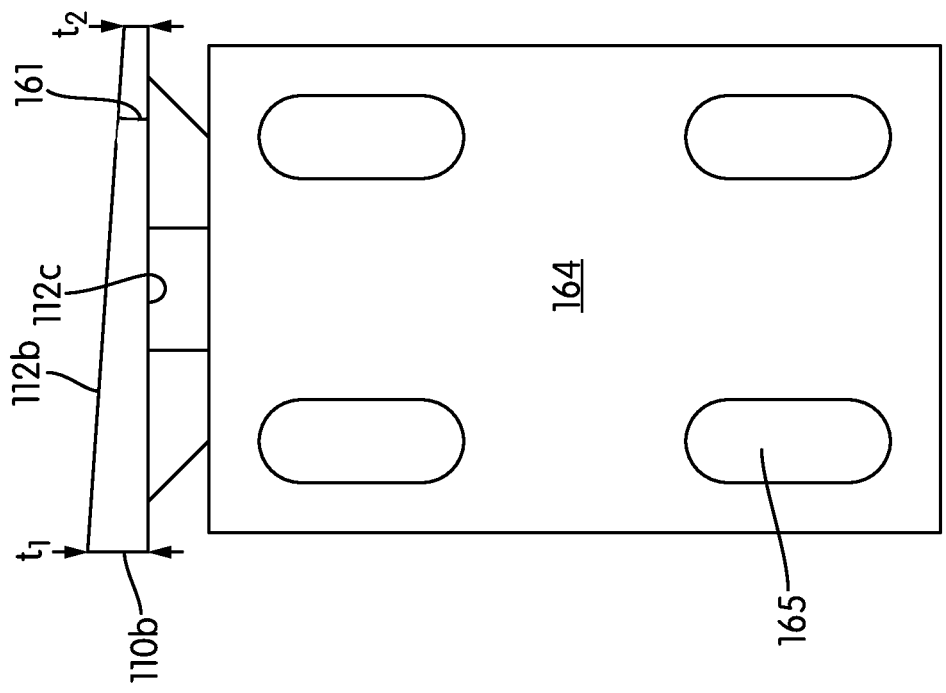
FIG. 8E is a bottom view of the double-flexure mirror bearing of FIG. 8A.
Figure 8D:
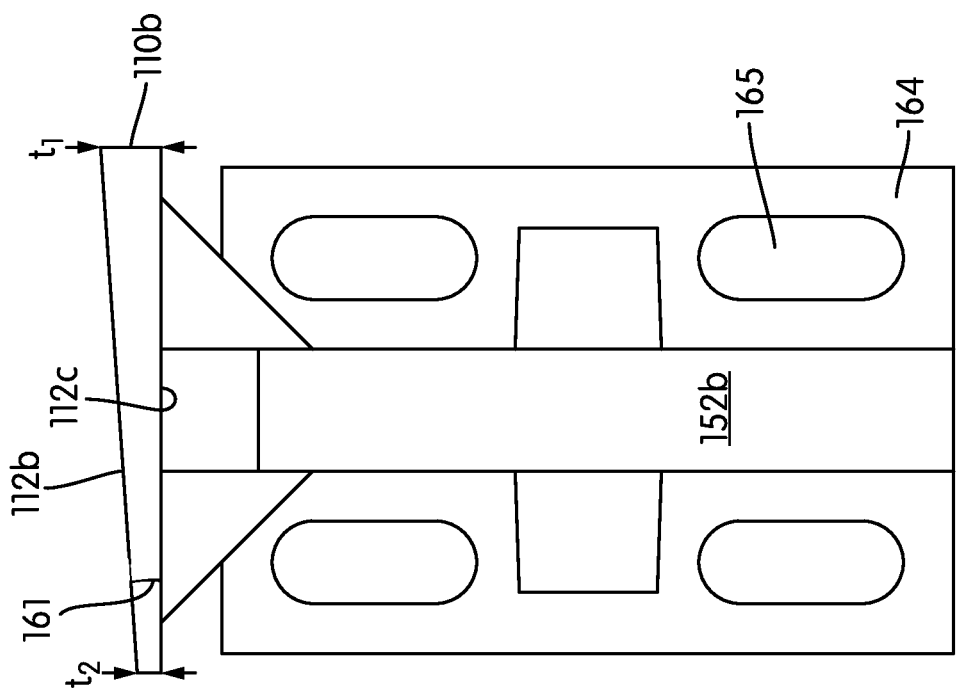
FIG. 8D is a top view of the double-flexure mirror bearing of FIG. 8A.

Referring to FIGS. 8D and 8E, top (FIG. 8D) and bottom (FIG. 8E) views of the moveable mirror assembly further illustrate the tapered nature of the mirror 110b such that its reflective surface 112b forms an angle 161 away from being parallel with the mounting surface 112c.

Figure 8G:
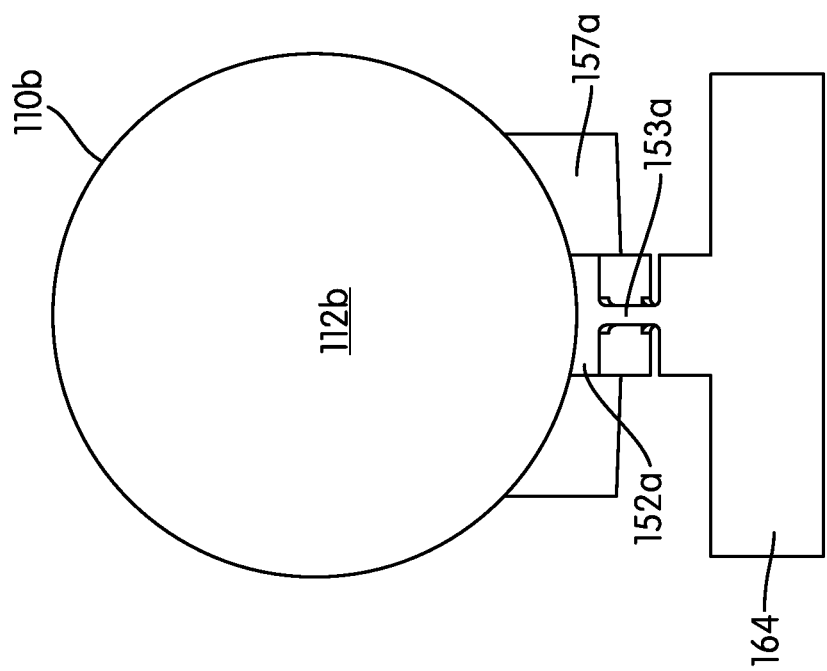
FIG. 8G is a front view of the double-flexure mirror bearing of FIG. 8A.
Figure 8F:
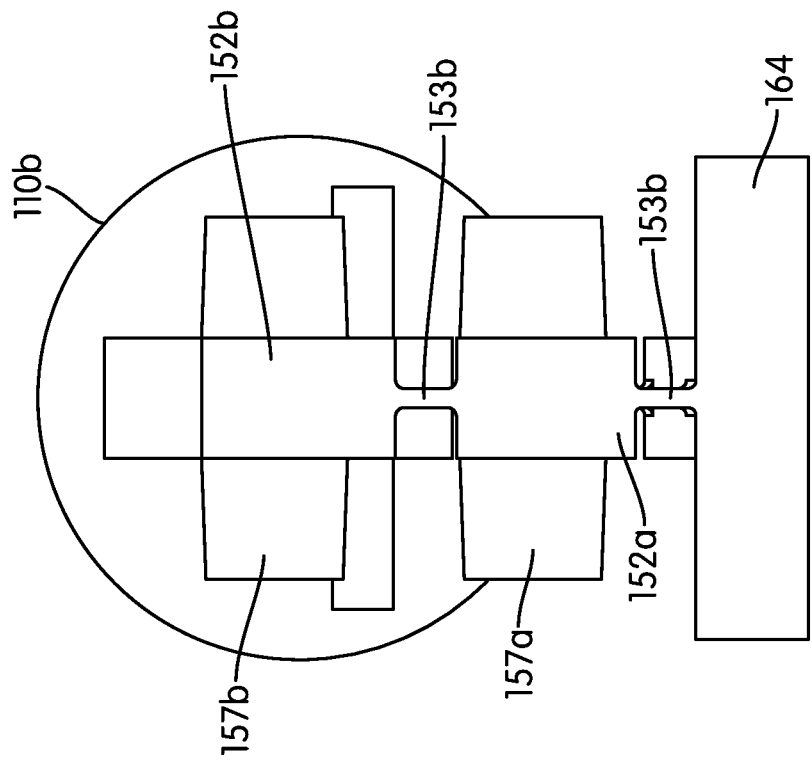
FIG. 8F is a rear view of the double-flexure mirror bearing of FIG. 8A.

Referring to FIGS. 8F and 8G, rear (FIG. 8F) and front (FIG. 8G) views illustrate exemplary mounting positions of the mirror 110b relative to the upper 152b and lower 152a mount portions.

Figure 9:
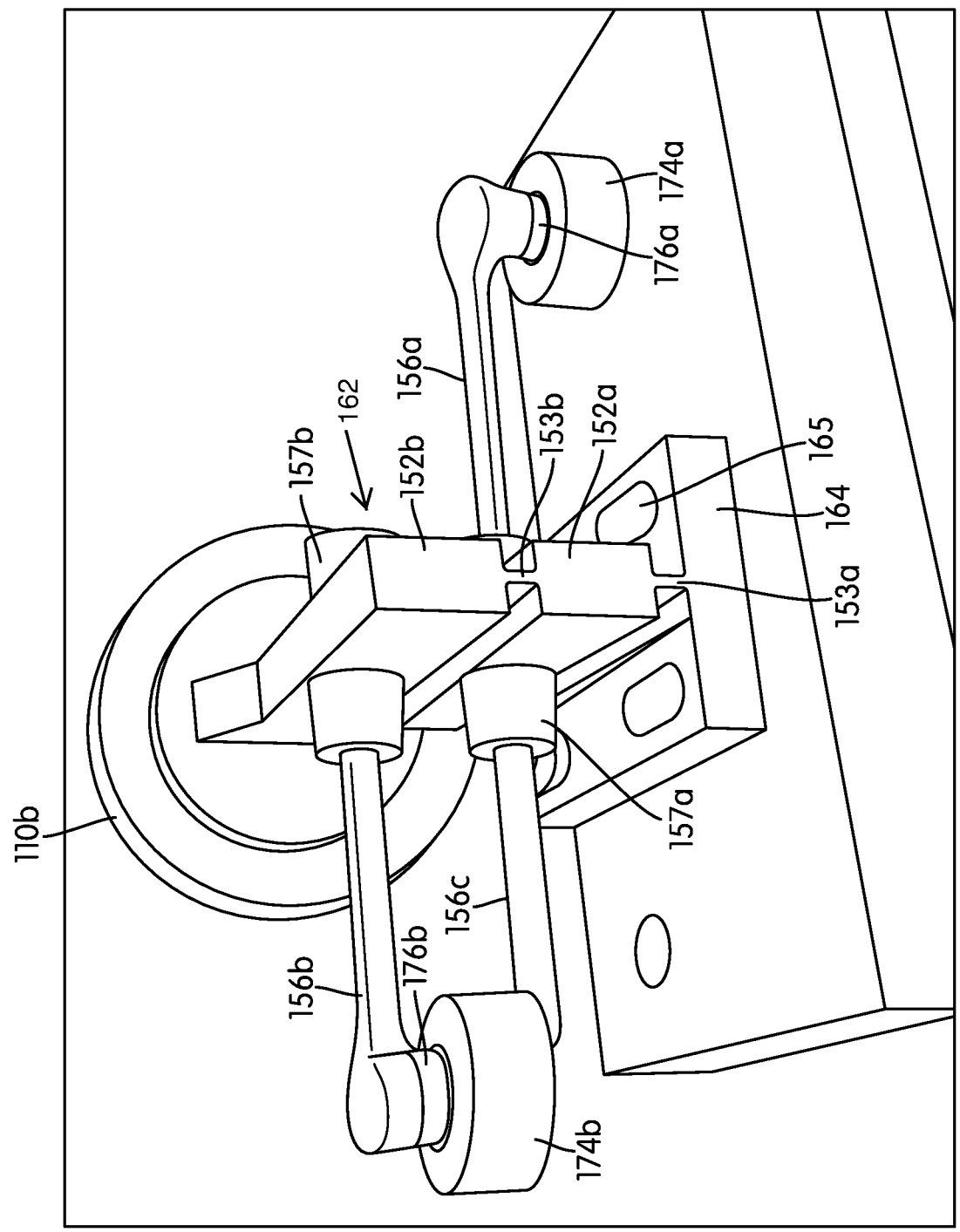
FIG. 9 is a perspective view of another double-flexure mirror bearing in accordance with aspects of the disclosure.

Referring to FIG. 9, in accordance with other embodiments, the moveable mirror assembly of FIG. 8A can be implemented such that the movement of the lower mount portion 152a is controlled by a lower drive mechanism (e.g., a linear or voice coil motor 174a and magnet 176a) and lower control arm 156a, similar to the assembly of FIG. 8A. Motion of the second, or upper, mount portion 152b can be controlled relative to the lower mount portion 152a and lower control arm 156c with a second, or upper, drive mechanism (e.g., a linear or voice coil motor 174b and magnet 176b) and upper control arm 156b. In this implementation, the upper drive mechanism 174b, 176b via the upper control arm 156b and control arm mount 157b, imparts motion to the upper mount portion 152b relative to the lower mount portion 152a. As in the example discussed above, depending upon the mounting of the mirror 110b to the upper mount portion 152b, this results in rotation of the mirror 110b about the axis defined by the lower flexures 153a, or rotation of the mirror 110b about the axis defined by upper flexures 153b, which can be coaxial with, or offset from, a center of mirror 110b.

Figure 10:
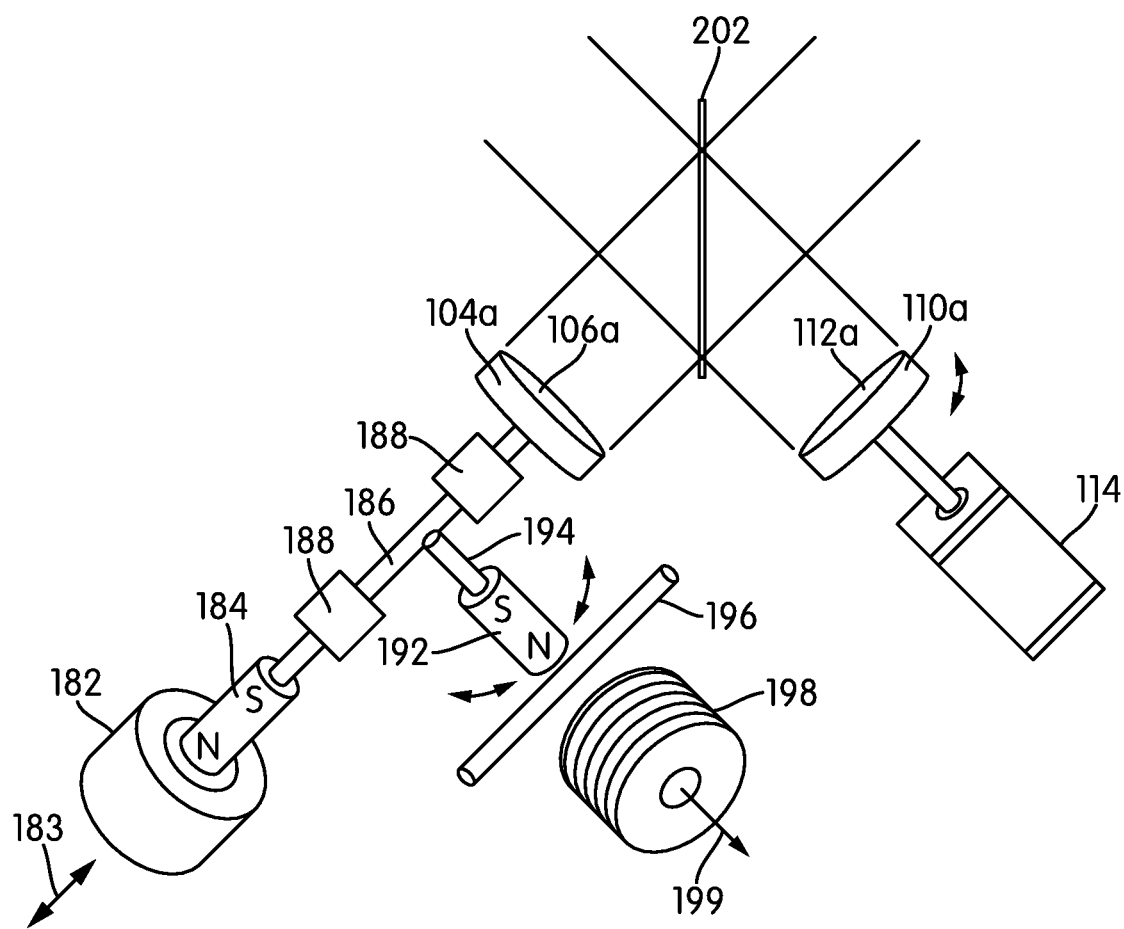
FIG. 10 is a schematic view of another example of movable mirror assemblies in an FTIR interferometer in accordance with aspects of the disclosure.

Referring to FIG. 10, in accordance with further exemplary embodiments, the interferometer of FIG. 5 can be implemented using an alternative implementation of the first moveable mirror assembly. As previously discussed, the reflective surfaces 106a, 112a of the mirrors 104a, 110a define planes that are slightly offset from being parallel with their respective axes orthogonal to the axes of motion imparted by their respective driving mechanisms 182, 114. In this implementation, a first linear drive assembly 181 imparts linear movement to mirror 104a. First linear drive assembly 181 includes a linear drive motor 182 that imparts motion by way of variable magnetic fields such that a magnet 184 reciprocates along a longitudinal axis 183 to effect longitudinal motion of the moveable mirror 104a (see, e.g., U.S. Pat. No. 5,883,712). This movement of the mirror 104a is imparted via a shaft 186 supported by linear bearings 188. Rotational stability and movement is controlled via a magnet 192 affixed via a radial coupling shaft 194 to the shaft 186. During operation of this moveable mirror assembly, as the magnet 184 reciprocates within the linear motor 182, causing the shaft 186 to reciprocate within the linear bearings 188, rotational stability is maintained by attraction of the magnet 192 to a guide rail 196 extending parallel to the shaft 186. Rotational control of the shaft 186 may be controlled by this magnet 192 and guide rail 196. In the event that rotation is desired, drive current from a source (not shown) is provided to a drive coil 198, which in turn causes guide rail 196 to move parallel to the axis 199 of the coil 198. Small movements of this guide rail 196 parallel to this axis 199 will result in the magnet 192 following such movements and thereby imparting rotational movement of the shaft 186 (see, e.g., U.S. Pat. No. 5,896,197). In cases where the amount of linear travel needed is low (e.g. less than about 8 mm), guide rail 196 can be fixed in location and the magnetic field from coil 198 can directly put a force on magnet 192 and rotate the moving mirror 104a about 2 degrees with good control. That limited travel amount is all that is needed in some cases.

Hence, at least three basic exemplary embodiments can be realized, from which numerous alternative variations may be implemented by those skilled in the art. For example, a single mirror may be mounted on a single bearing (e.g., with a rotation axis to give one axis of control), in which case, two mirrors mounted in such manner will provide X, Y (e.g., horizontal and vertical) motion control. Also, a single mirror may be mounted on a linear round bearing to provide linear travel (along the Z-axis) and rotation (to provide either X or Y axis control). In an interferometer a second flat mirror can be used to provide the missing X or Y axis control, thereby enabling two axes of tilt control and one axis of linear movement needed in a Michelson interferometer.

Figure 11:
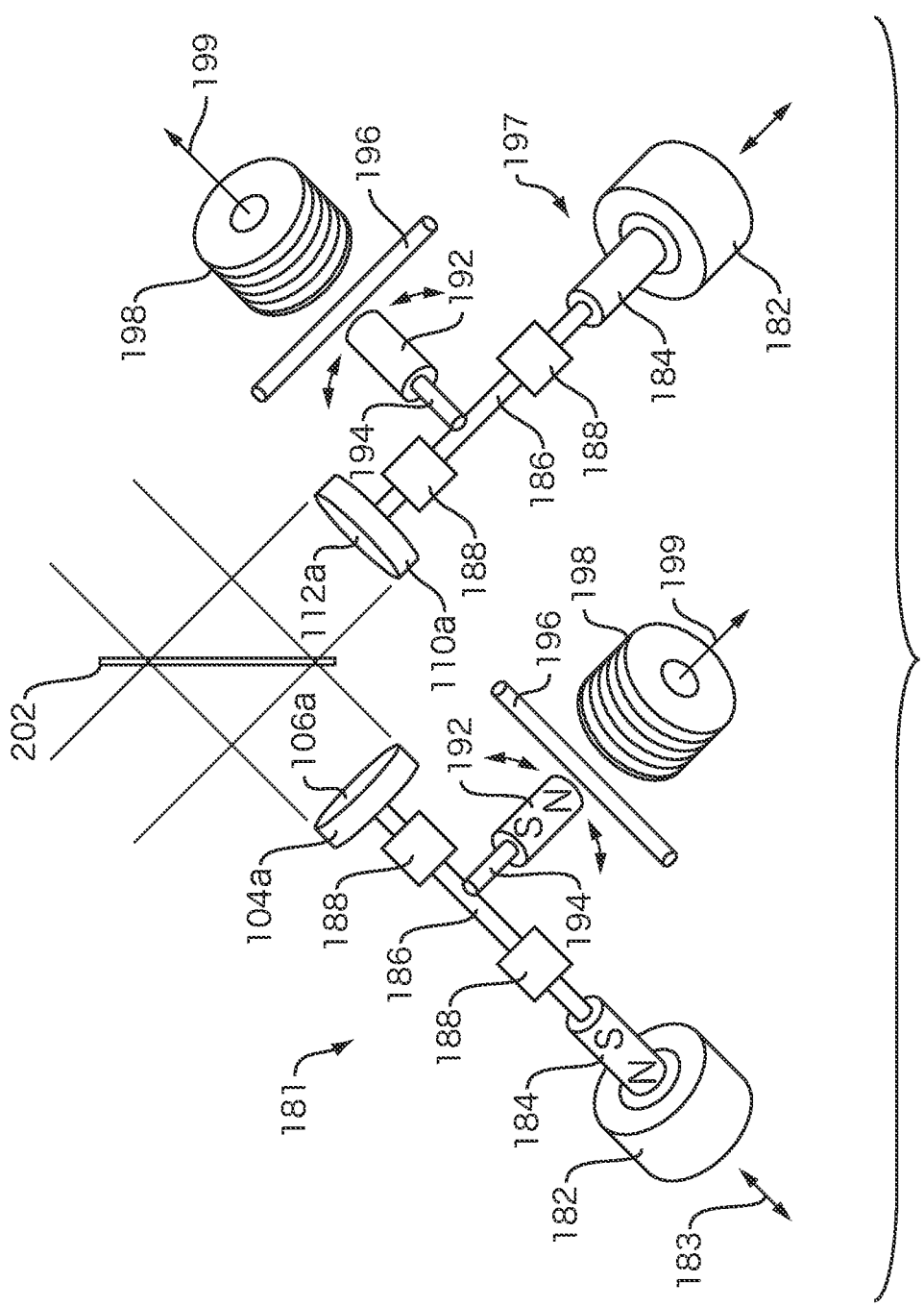
FIG. 11 is a schematic view of yet another example of movable mirror assemblies in an FTIR interferometer in accordance with aspects of the disclosure.

Referring to FIG. 11, an alternative embodiment of the mirror assembly of FIG. 10 is illustrated. In this embodiment, mirror 110a includes a second linear drive assembly 197 with a linear drive motor 182 and a magnet 184 that reciprocates along longitudinal axis 183 to effect longitudinal motion of the moveable mirror 110a like that of mirror 104a in FIG. 10. This movement of the mirror 110a is imparted via a shaft 186 supported by linear bearings 188. Rotational stability and movement is controlled via a magnet 192 affixed via a radial coupling shaft 194 to the shaft 186. During operation of this moveable mirror assembly, as the magnet 184 reciprocates within the linear motor 182, causing the shaft 186 to reciprocate within the linear bearings 188, rotational stability is maintained by attraction of the magnet 192 to a guide rail 196 extending parallel to the shaft 186. Rotational control of the shaft 186 may be controlled by this magnet 192 and guide rail 196. In the event that rotation is desired, drive current from a source (not shown) is provided to a drive coil 198, which in turn causes guide rail 196 to move parallel to the axis 199 of the coil 198. Small movements of this guide rail 196 parallel to this axis 199 will result in the magnet 192 following such movements and thereby imparting rotational movement of the shaft 186 (see, e.g., U.S. Pat. No. 5,896,197). In cases where the amount of linear travel needed is low (e.g. less than about 8 mm), guide rail 196 can be fixed in location and the magnetic field from coil 198 can directly put a force on magnet 192 and rotate the moving mirror 110a about 2 degrees with good control. That limited travel amount is all that is needed in some cases.

It is to be appreciated that the longitudinal movement of moveable mirrors 104a, 110a can be implemented by mechanisms other than the linear drive motor and magnet described above. For example, the longitudinal movement can be implemented using a magnetic drive with a graphite on graphite bearing, as disclosed in U.S. patent application Ser. No. 16/034,970, entitled "Mirror Bearing for Interferometer," filed on Jul. 13, 2018, the entire disclosure of which is incorporated herein by reference in its entirety.

In accordance with exemplary embodiments as discussed herein, with the mirror mounted about 89.5 degrees away from being parallel (0.5 degree away from perpendicular) to the axis of motion, 180 degrees of rotation of the mirror produces a one degree reflected light angle. One degree of rotation produces a reflected light angle difference of 0.0175 degree (one degree multiplied by the sine function of one degree). The ratio of the amount of rotation around the bearing axis compared to the reduction in light beam tilt can be termed an optical gear ratio, which is about 57:1 in this case. If the mirror angle is doubled to 89.0 degrees away from being parallel (1.0 degree away from perpendicular) to the axis of rotation, one degree of rotation produces two degrees of reflected light angle difference, and a reflected light angle difference of 0.034 degree (two degrees multiplied by the sine function of one degree), which produces an optical gear ratio of about 28:1. This optical gear ratio gives a good feel for how the mirror assembly allows the use of a low cost motor to provide very fine control of small angle changes needed in many optical systems.

Figure 12:
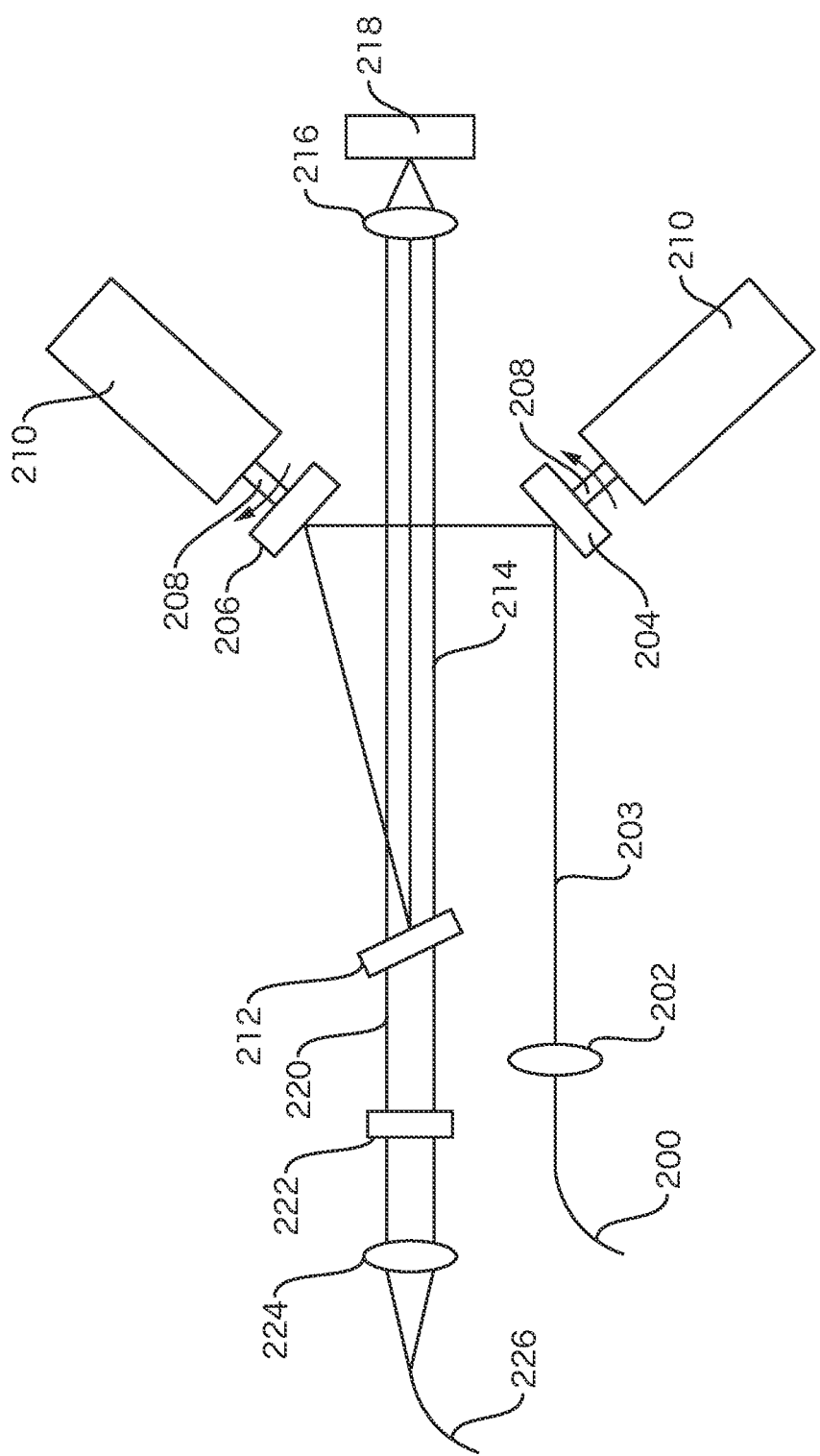
FIG. 12 is a schematic view demonstrating a dual mirror implementation of alignment principles with a Raman spectroscope.

As noted above, such mirror assemblies can be used in devices other than interferometers. As seen in FIG. 12, a mirror assembly with two mirrors is implemented in a Raman spectroscope.

Light from a laser is brought into the system by an optical fiber 200, and is collimated by a lens 202 to produce a laser beam 203. A first mirror 204 and a second mirror 206 each may be mounted as discussed above such that their surface is angled with respect to a plane perpendicular to the bearing axis of shafts 208 of the motors 210 to which they are connected. It is to be appreciated that motors 210 may be stepping motors. First mirror 204 and second mirror 206 may be mounted such they produce variable deviations along two orthogonal axes. This provides 2-axis deviation of laser beam 203.

Laser beam 203 may be reflected by a dichroic filter 212, and forms a main beam path 214, which may be focused by a lens 216 to a sample 218. Scattered light from the sample (e.g., by Raman scattering) may return along the same beam path 214, and pass through dichroic filter 212 to form a beam 220 that then passes through a second dichroic filter 222 and is focused by a lens 224 to a second optical fiber 226.

For effective operation of an experiment with Raman spectroscopy, laser beam 203 and the returning main beam path 214 must be parallel to within a milliradian or better. First and second mirrors 204, 206 allow this alignment to be achieved as discussed above, and may be operated under software control.

A possible embodiment using the mirror assembly with two mirrors for Raman spectroscopy works as follows. A sample known to produce Raman scattering is located at sample 218. The intensity of the Raman scattering is measured in optical fiber 226 by coupling optical fiber 226 to a spectrograph. Motors 210 are activated to rotate first mirror 204 and second mirror 206 until the Raman scattering intensity is maximized.

Figure 13:
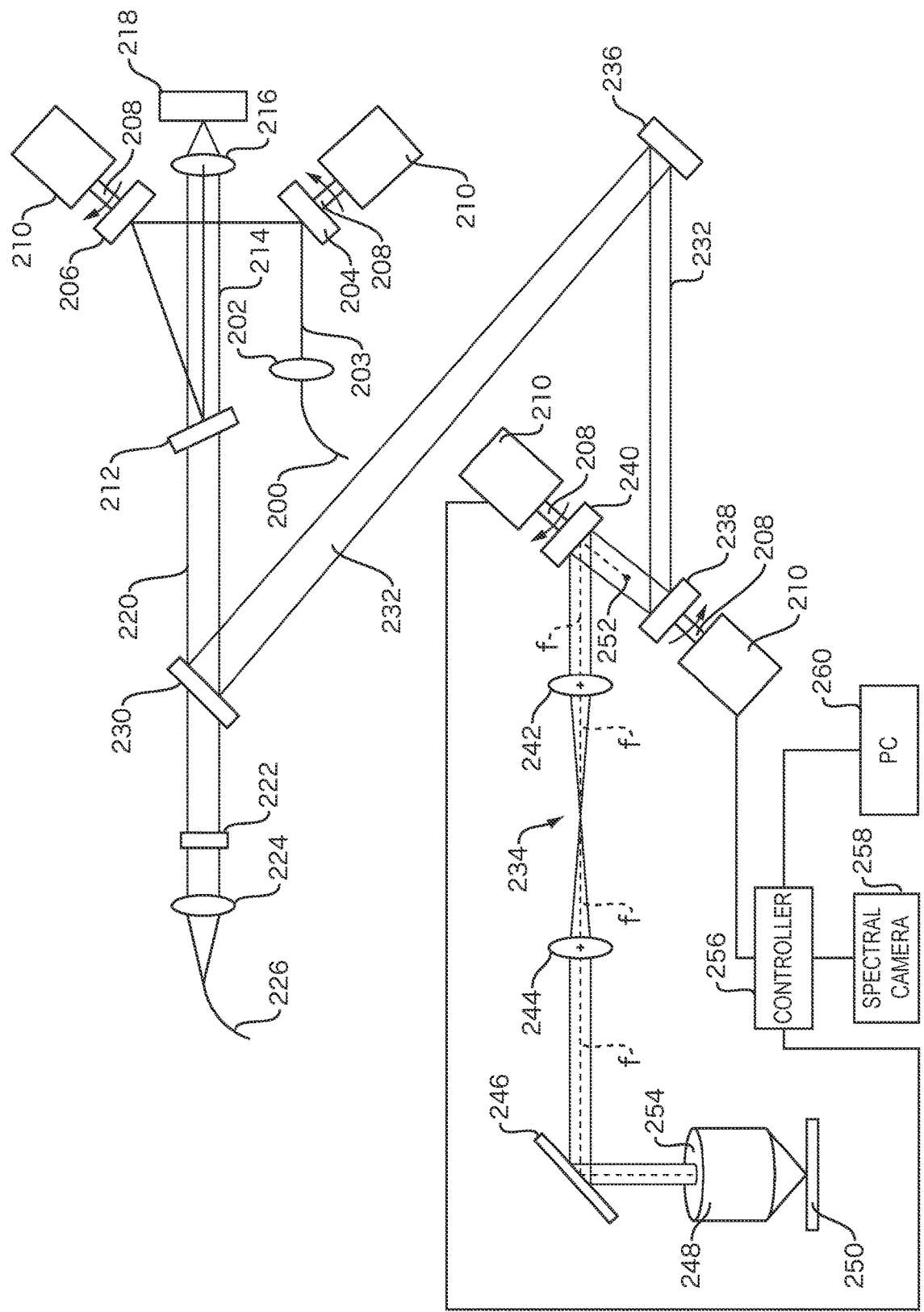
FIG. 13 is a schematic view demonstrating a dual mirror implementation of alignment principles for use in making a sample map by laser scanning.

As seen in FIG. 13, an additional mirror assembly with two mirrors is implemented for mapping with a laser scanner. Such an embodiment uses the assembly seen above in FIG. 12 as a means of aligning a laser to a spectrograph, as described above. This embodiment adds the feature of making a sample map by laser scanning.

Historically, high resolution laser scanning maps have been made with a piezo tip-tilt mirror or by using a set of two galvanometers. However, these methods are generally expensive. The embodiment disclosed herein allows for fairly high imaging resolution (depending on the angle the mirror is mounted on the shaft of the motor) but at an extremely low cost. It is this combination of high resolution and low cost that make this system attractive.

The present embodiment works by scanning a laser over a sample, and building an image pixel by pixel. This is useful for cases where the sample cannot be map using an existing stage. Additionally, in cases where a sample is sensitive to fast motion, it can be advantageous to map it by scanning the laser rather than moving the sample.

In this embodiment, a portion of laser beam 220 may be reflected by an edge filter 230 to produce a laser beam 232 that is transmitted to a relay telescope 234. Laser beam 232 may be reflected by way of a mirror 236 or transmitted directly to relay telescope 234. The angle of beam 232 can be controlled as described above with a third mirror 238 and a fourth mirror 240. Third mirror 238 and fourth mirror 240 each may be mounted as discussed above such that their surface is angled with respect to a plane perpendicular to the bearing axis of shafts 208 of the motors 210 to which they are connected. It is to be appreciated that motors 210 may be stepping motors. Third mirror 238 and fourth mirror 240 may be mounted such they produce variable deviations along two orthogonal axes. This provides 2-axis deviation of laser beam 232.

Laser beam 232 travels from fourth mirror 240 to relay telescope 234, which may include a first relay lens 242 and a second relay lens 244. Laser beam 232 then travels through first relay lens 242 and second relay lens 244, and may be reflected by a mirror 246 through an objective lens 248 to a sample 250.

Each of first relay lens 242 and second relay lens 244 has a focal length f. Relay telescope 234 maps a spot that is 4*f away to the same spot as the angle changes. So in this embodiment, an arbitrary spot 252 in between third mirror 238 and fourth mirror is set to be a distance 4*f from the back aperture 254 of objective lens 248. Relay telescope 234 is then is placed in the center between arbitrary spot 252 and back aperture 254.

It is to be appreciated that third mirror 238 and fourth mirror 240 may be controlled by a controller 256 that can send signals or triggers to a spectral camera 260, allowing for a DXRxi-style data collection to be performed. Rather than stopping and acquiring at each pixel, spectral camera 260 is acquiring data while the third mirror 238 and fourth mirror 240 are in motion. It is to be appreciated that a PC 260 or other suitable computer may be connected, e.g., by a USB connection or other suitable connection, to controller 256.

Hence, variations in mirror angle relative to the axis of rotation can provide variations in the available optical gear ratios, thereby enabling control for reducing speeds and errors often associated with the use of lower cost motors while achieving more precise and fine control over small light angle adjustments needed in many optical systems, such as telescopes, microscopes, and interferometers. In other words, while there may be some reductions in speed and range of control, increased optical gear ratios improve stiffness and control at the expense of reducing control speed. Further, by using a small offset angle, the optical gear ratio allows the use of lower accuracy and lower stiffness drive motors to be used, thereby reducing cost. The increase in stiffness and fine control provided by the optical gear ratio enables improved operation and control in high vibration environments such as a moving vehicle. Also, a dual motor and mirror system as discussed above with respect to FIG. 2 can enable precise aiming of a telescope or microscope at a small object or sample. Further, it can enable alignment(s) of different parts of an optical system to each other, such as in systems in which multiple "Z-fold" configurations of mirrors and motors are placed in an available space within an optical system.

The mirror assemblies disclosed herein may be controlled via a computer or processor (not shown), which may be a special-purpose computing device, a computing device specially programmed with appropriate computer-executable instructions stored on a non-transitory computer-readable storage medium, a digital signal processor, an application-specific integrated circuit, and the like, being configured to selectively provide the motor assemblies with current(s) in the desired direction(s) and in the desired amount(s), as well as other control signals as appropriate, so as to cause the actuators, control arms, etc., to move in the desired direction(s). Suitable non-transitory computer-readable storage media includes that which have encoded information provided in a form that can be read (i.e., scanned/sensed) by a machine/computer and interpreted by the machine's/computer's hardware and/or software. In particular, the computer-readable storage media may include local or remote memory storage devices that include a local hard disk, a floppy disk, a CD-ROM or DVD, RAM, ROM, a USB memory device, and remote memory storage devices. The computer or processor may also be electronically coupled to one or more other analytical instruments as well as output devices, such as display screens, printers, and the like and/or one or more input devices, such as keyboards, pointing devices, styluses, touchscreens, network connections, and the like. Thus, a computer or processor coupled to the mirror bearing disclosed herein can orchestrate the control of the mirror bearing, which may be incorporated into an interferometer as discussed above.

Overall aspects of the disclosure are directed to movable mirror assemblies for analytical instruments such as interferometers. Those having skill in the art, with the knowledge gained from the present disclosure, will recognize that various changes can be made to the disclosed devices and methods in attaining these and other advantages, without departing from the scope of the present disclosure. Accordingly, it should be understood that the features described herein are susceptible to changes or substitutions. The specific embodiments illustrated and described herein are for illustrative purposes only, and not limiting of the subject matter as set forth in the appended claims.

What is claimed is:

1. A mirror assembly for precise control of a light beam, comprising:
   a first mount including a first axis of rotation;
   a first mirror coupled to the first mount that includes a reflective surface having a surface plane that is nearly perpendicular to a plane of the first axis of rotation; and
   a light source configured to aim a beam at the reflective surface,
   wherein rotation of the first mount translates the beam over a first controllable distance on a target surface, and
   wherein the axis of rotation is offset from a center of the first mirror.

2. The mirror assembly of claim 1, wherein:
   the controllable distance is provided by an amount of tilt of the reflected beam.

3. The mirror assembly of claim 2, wherein:
   the amount of tilt of the reflected light beam comprises a range of approximately 0.001 to approximately 5 degrees of tilt.

4. The mirror assembly of claim 1, wherein:
   the reflective surface is substantially planar.

5. The mirror assembly of claim 1, wherein:
   the controllable distance comprises movement of the light beam in an X axis or a Y axis on the target surface.

6. The mirror assembly of claim 1, wherein:
   the controllable distance comprises movement of the light beam over a distance from approximately 0.1 mm to approximately 50 mm on the target surface with a target distance of approximately 300 mm from the first mirror surface.

7. The mirror assembly of claim 1, wherein:
   the rotation of the first mount comprises approximately 1 to approximately 20 degrees of rotation.

8. The mirror assembly of claim 1, wherein:
   the rotation of the first mount is limited to approximately 20 degrees or less of rotation.

9. The mirror assembly of claim 1, wherein:
   the rotation of the first mount is limited to approximately 5 degrees or less.

10. The mirror assembly of claim 9, wherein:
    the rotation of the mount of approximately 5 degrees or less minimizes a curvature error of the movement of the beam on the target surface.

11. The mirror assembly of claim 1, wherein:
    the light source comprises a laser that produces a spot on the target surface.

12. The mirror assembly of claim 1, wherein:
    the surface plane is approximately 1 to approximately 4 degrees from a plane perpendicular to the axis of rotation.

13. The mirror assembly of claim 1, wherein:
    the surface plane is less than one degree from a plane perpendicular to the axis of rotation.

14. The mirror assembly of claim 1, wherein:
    the axis of rotation is co-axial with a center of the first mirror.

15. The mirror assembly of claim 1, wherein:
    the mount is coupled to a flexure bearing.

16. The mirror assembly of claim 15, wherein:
    the flexure bearing comprises one or more blade flexures.

17. The mirror assembly of claim 1, wherein:
    the mount is coupled to a first and a second bearing.

18. The mirror assembly of claim 17, wherein:
    the first and the second bearing comprise approximately a 4 degree angle of offset from each other.

19. The mirror assembly of claim 17, wherein:
    the first and the second bearing each comprise a rotation control system.

20. The mirror assembly of claim 19, wherein:
    the rotation control system comprises a hand screw, an electric motor, a stepper motor, or a linear motor.

21. The mirror assembly of claim 1, wherein:
    the first mount is coupled to a motor.

22. The mirror assembly of claim 1, further comprising:
    a second mount comprising an axis of rotation; and
    a second mirror coupled to the second mount that comprises a reflective surface having a surface plane that is nearly perpendicular to the axis of rotation,
    wherein the first mirror aims the beam at the reflective surface of the second mirror and rotation of the second mount translates the beam over a second controllable distance on the target surface.

23. The mirror assembly of claim 22, wherein:
    the first controllable distance is along a first axis that is perpendicular to a second axis of the second controllable distance.

24. The mirror assembly of claim 22, wherein:
    the first controllable distance is along a first axis that is offset by approximately 0.1 to approximately 10 degrees from a second axis of the second controllable distance.

25. The mirror assembly of claim 22, wherein:
    the rotation of the second mount is limited to approximately 5 degrees or less.

26. The mirror assembly of claim 25, wherein:
    the rotation of the second mount of approximately 5 degrees or less corrects the curvature error of the movement of the beam from the first mirror on the target surface.

27. An interferometer mirror assembly comprising:
    a beamsplitter defining incoming and outgoing optical paths;
    a first movable mirror assembly disposed at least partially in one of said incoming and outgoing optical paths, and comprising:

a first mount including a first axis of motion;

a first mirror coupled to the first mount that includes a reflective surface having a surface plane that is nearly perpendicular to the first axis of motion; and a light source configured to aim a beam at the reflective surface, wherein rotation of the first mount translates the beam over a first controllable distance on a target surface; and a second movable mirror assembly disposed at least partially in another of said incoming and outgoing optical paths, and comprising:

a second mount including a second axis of motion; and a second mirror coupled to the second mount that includes a reflective surface having a surface plane that is nearly perpendicular to the second axis of motion, wherein reflected light from the first mirror is directed to the reflective surface of the second mirror, and wherein rotation of the second mount translates the beam over a second controllable distance on the target surface that is substantially perpendicular to the first controllable distance.

28. The interferometer mirror assembly of claim 27, wherein the first mount includes a third axis of motion substantially orthogonal to said first axis of motion.

29. The interferometer mirror assembly of claim 28, wherein the first axis of motion and the second axis of motion are each an axis of rotation and the third axis of motion is an axis of translation.

30. An interferometer mirror assembly comprising:

a beamsplitter defining incoming and outgoing optical paths;

a first movable mirror assembly disposed at least partially in one of said incoming and outgoing optical paths, and comprising:

a first mount including a first axis of motion;

a first mirror coupled to the first mount that includes a reflective surface having a surface plane that is nearly perpendicular to the first axis of motion;

a first linear drive assembly that moves the first movable mirror in a linear fashion along a longitudinal axis; and a light source configured to aim a beam at the reflective surface, wherein rotation of the first mount translates the beam over a first controllable distance on a target surface; and a second movable mirror assembly disposed at least partially in another of said incoming and outgoing optical paths, and comprising:

a second mount including a second axis of motion; and a second mirror coupled to the second mount that includes a reflective surface having a surface plane that is nearly perpendicular to the second axis of motion, wherein reflected light from the first mirror is directed to the reflective surface of the second mirror, and wherein rotation of the second mount translates the beam over a second controllable distance on the target surface that is substantially perpendicular to the first controllable distance.

31. The interferometer mirror assembly of claim 30, wherein the second movable mirror assembly includes a second linear drive assembly that moves the first movable mirror in a linear fashion along a longitudinal axis.

\* \* \* \* \*